United States Patent
Um et al.

(10) Patent No.: US 9,315,659 B2
(45) Date of Patent: *Apr. 19, 2016

(54) RESIN COMPOSITION AND OPTICAL COMPENSATION FILM FORMED USING THE SAME

(71) Applicant: LG CHEM, LTD., Seoul (KR)

(72) Inventors: Jun-Geun Um, Daejeon-si (KR); Jeong-Min Choi, Daejeon-si (KR); Jun-Wuk Park, Daejeon-si (KR); Nam-Jeong Lee, Daejeon-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/119,162

(22) PCT Filed: Oct. 4, 2012

(86) PCT No.: PCT/KR2012/008021
§ 371 (c)(1),
(2) Date: Nov. 20, 2013

(87) PCT Pub. No.: WO2013/051847
PCT Pub. Date: Apr. 11, 2013

(65) Prior Publication Data
US 2014/0128546 A1   May 8, 2014

(30) Foreign Application Priority Data

Oct. 4, 2011 (KR) .................. 10-2011-0100836
Oct. 4, 2012 (KR) .................. 10-2012-0109800

(51) Int. Cl.
C08L 39/04 (2006.01)
C08L 35/02 (2006.01)
C08L 35/04 (2006.01)

(52) U.S. Cl.
CPC .............. C08L 39/04 (2013.01); C08L 35/02 (2013.01); C08L 35/04 (2013.01); C08L 2203/16 (2013.01)

(58) Field of Classification Search
CPC .......... C08L 39/04; C08L 33/20; C08L 25/12
USPC ........................................ 525/133
See application file for complete search history.

(56) References Cited

U.S. PATENT DOCUMENTS

| | | | | |
|---|---|---|---|---|
| 8,120,729 B2* | 2/2012 | Choi et al. | | 349/96 |
| 8,309,670 B2* | 11/2012 | Lee et al. | | 526/326 |
| 8,928,976 B2* | 1/2015 | Kang et al. | | 359/483.01 |
| 2002/0028881 A1* | 3/2002 | Brandenburg et al. | | 525/191 |
| 2007/0002228 A1 | 1/2007 | Yano et al. | | |
| 2007/0279741 A1 | 12/2007 | Yoshioka et al. | | |
| 2009/0197020 A1 | 8/2009 | Kim et al. | | |
| 2009/0273838 A1 | 11/2009 | Um et al. | | |
| 2009/0275718 A1* | 11/2009 | Um et al. | | 526/262 |
| 2010/0053508 A1* | 3/2010 | Choi et al. | | 349/96 |
| 2011/0297896 A1 | 12/2011 | Kim et al. | | |
| 2012/0249900 A1* | 10/2012 | Koike et al. | | 349/15 |
| 2014/0071530 A1* | 3/2014 | Park et al. | | 359/489.03 |

FOREIGN PATENT DOCUMENTS

| | | |
|---|---|---|
| CN | 100495087 C | 6/2009 |
| CN | 102027048 A | 4/2011 |
| JP | 1989-172444 A | 7/1989 |
| JP | 2008-262180 A | 10/2008 |
| JP | 2011-519389 A | 7/2011 |
| JP | 2011-519434 A | 7/2011 |
| KR | 10-2006-0027868 A | 3/2006 |
| KR | 10-0849873 B1 | 7/2008 |
| KR | 10-2009-0076835 A | 7/2009 |
| KR | 10-2009-0115041 A | 11/2009 |
| KR | 10-2010-0094425 A | 8/2010 |
| TW | 200948887 A1 | 12/2009 |
| WO | 2009-139353 A1 | 11/2009 |
| WO | 2010/061917 A1 | 6/2010 |

OTHER PUBLICATIONS

Machine Translation of JP 2008262180 A.*

* cited by examiner

*Primary Examiner* — Mike M Dollinger
(74) *Attorney, Agent, or Firm* — Dentons US LLP

(57) ABSTRACT

There are provided a resin composition and an optical compensation film formed using the same, and more particularly, to a resin composition comprising (a) alkyl (meth)acrylate units, (b) styrene units, (c) 3 to 6 element heterocyclic units substituted with at least one carbonyl group and (d) vinyl cyanide units, and an optical film formed using the resin composition. Further, a resin composition according to the present invention can provide an optical film having excellent optical properties and superior optical transparency, less haze and superior mechanical strength and heat resistance simultaneously. Therefore, an optical film formed using a resin composition of the present invention can be used in various applications, e.g., electronic information devices such as display devices. Particularly, the optical film is suitable for a compensation film used in the IPS mode.

16 Claims, No Drawings

RESIN COMPOSITION AND OPTICAL COMPENSATION FILM FORMED USING THE SAME

This application is a national stage application of International Application No. PCT/KR2012/008021, filed on Oct. 4, 2012, which claims priority to and the benefit of Korean Patent Application Nos. 10-2011-0100836, filed Oct. 4, 2011, and 10-2012-0109800, filed Oct. 4, 2012, in the Korean Intellectual Property Office, the entire contents of which are incorporated herein by reference.

TECHNICAL FIELD

The present invention relates to a resin composition and an optical compensation film formed using the same, and more particularly, to a resin composition comprising alkyl (meth)acrylate units, styrene units, 3 to 6 element heterocyclic units substituted with at least one carbonyl group and vinyl cyanide units, and an optical compensation film for IPS formed using the same.

BACKGROUND ART

LCDs have been widely used as optical display devices since Liquid Crystal Displays (LCDs) have low power consumption, a small volume and are light, such that they can be easily carried, as compared to cathode ray tube displays. In general, LCDs have a basic configuration in which polarizing plates are installed on both sides of liquid crystal cells, and the alignment of liquid crystal cells changes according as if an electric field has been applied to the driving circuit. Accordingly, visualization of light is accomplished as characteristics of light transmitted through the polarizing plates vary. Path and birefringent properties of light vary according to an angle of incident light, since liquid crystal is an anisotropic substance having two different refractive indexes.

Due to such properties, LCDs may be problematic, in that LCDs have varied contrast ratios as measures for estimating how clearly images are shown according to viewing angles, and gray scale inversion phenomena may be generated in LCDs to thereby result in low visibility.

In order to overcome such problems, optical compensation films compensating optical retardations generated in liquid crystals are used in liquid crystal display devices, and such optical compensation films may include stretched birefringent polymeric films.

Examples of materials for stretched birefringent polymeric films may include polymethyl methacrylate (PMMA), polystyrene (PS), polycarbonate (PC), a maleimide copolymer, and cyclic polyolefin. The polycarbonate (PC), the maleimide copolymer, and the cyclic polyolefin, among the examples, are optically anisotropic polymeric materials which increase refractive indexes in the alignment direction when molecular chains of the materials are stretched and aligned, i.e., have positive birefringence properties. On the other hand, PMMA or PS is an optically anisotropic polymeric material which increases the refractive index in a direction that is different from the alignment direction when molecular chains of the material are stretched and aligned, i.e., has negative birefringent properties. Examples of polymeric materials mainly used at present in optical compensation films for improving viewing angles of liquid crystal displays may include polycarbonate, maleimide copolymer, and cyclic polyolefin.

On the other hand, various liquid crystal modes have been developed to secure vivid image qualities and wide optical viewing angles in the LCDs, and typically include Double Domain TN (Twisted Nematic), ASM (axially symmetric aligned microcell), OCB (optically compensated blend), VA (vertical alignment), MVA (multidomain VA), SE (surrounding electrode), PVA (patterned VA), IPS (in-plane switching), and FFS (fringe-field switching) modes. These respective modes have inherently aligned liquid crystals and innate optical anisotropies. Therefore, films compensating optical anisotropies corresponding to the respective modes are required to compensate for retardations due to optical anisotropies of these liquid crystal modes. Particularly in case of the IPS mode, liquid crystals having positive dielectric constant anisotropies are filled between polarizing plates. Therefore, the liquid crystals are aligned such that refractive indexes of the planar direction are larger than those of the thickness direction.

Therefore, studies of anisotropic films that can be used as optical compensation films of the IPS mode have been undertaken. Results of the studies, vertically aligned liquid crystal films, and biaxially stretched polymeric films having negative birefringent properties such as polycarbonate and polymethyl methacrylate have been suggested.

However, there are problems in that costs for the coating process are generated, there is a relatively large non-uniformity in retardations even by a minute difference between coating thickness values, and optical defects occur due to foreign objects such as dust may remain on the surface of a coating substrate film or may be present in the liquid crystal solution since vertically aligned liquid crystal films are prepared by accurately coating a bar-shaped low or high molecular weight liquid crystal molecule to a thickness of several microns (μm) on a transparent substrate. In case of a biaxially stretched film of a polymer such as polycarbonate or polymethyl methacrylate, having negative birefringent properties, there is a problem in that heat resistance may be insufficient due to a glass transition temperature near 100° C. although there are no problems in the above-mentioned vertically aligned liquid crystal compensation films.

DETAILED DESCRIPTION OF INVENTION

[Technical Problem]

An aspect of the present invention provides a resin composition for preparing an optical compensation film having excellent optical properties and superior durability such as strength and heat resistance simultaneously.

Another aspect of the present invention provides an optical compensation film prepared using a resin composition such as the above-mentioned composition.

[Solution Method of Problem]

According to an aspect of the present invention, there is provided a resin composition comprising (a) alkyl (meth)acrylate units, (b) styrene units, (c) 3 to 6 element heterocyclic units substituted with at least one carbonyl group, and (d) vinyl cyanide units.

The resin composition may comprise a combination of 2 member or 3 member copolymers of units selected from the group consisting of (a) alkyl (meth)acrylate units, (b) styrene units, (c) 3 to 6 element heterocyclic units substituted with at least one carbonyl group, and (d) vinyl cyanide units.

The (a) alkyl (meth)acrylate units may have alkyl moieties that are preferably methyl groups or ethyl groups.

The (b) styrene units may include one or more selected from the group consisting of styrene in which benzene ring or vinyl groups of styrene are substituted with one or more substituents selected from groups consisting of $C_{1-4}$ alkyl and halogen groups.

The (b) styrene units may be one or more selected from the group consisting of α-methyl styrene, p-bromo styrene, p-methyl styrene, and p-chloro styrene.

The (c) 3 to 6 element heterocyclic units substituted with at least one carbonyl group may be one or more selected from the group consisting of maleic anhydride, maleimide, glutaric anhydride, glutarimide, lactone, and lactam.

The (d) vinyl cyanide units may be one or more selected from the group consisting of acrylic acid, methacrylic acid, alkyl ester of acrylic acid and methacrylic acid, methacrylonitrile, acrylamide and acrylonitrile.

The resin composition may further comprises a phenoxy based resin.

The phenoxy based resin may be mixed in the amount of 0.1 to 5 weight parts with respect to 100 weight parts of the total resin composition.

The copolymer may be a combination of (A) a 2 member copolymer consisting of (a) alkyl (meth)acrylate units and (c) 3 to 6 element heterocyclic units substituted with at least one carbonyl group, and (B) a 2 member copolymer consisting of (b) styrene units and (d) vinyl cyanide units.

The copolymer (A) may comprise 50 to 99 weight parts, preferably 80 to 97 weight parts and more preferably 85 to 95 weight parts of (a) alkyl (meth)acrylate units with respect to 100 weight parts of the copolymer (A), and 1 to 50 weight parts, preferably 3 to 20 weight parts and more preferably 5 to 15 weight parts of (c) 3 to 6 element heterocyclic units substituted with at least one carbonyl group with respect to 100 weight parts of the copolymer (A).

The copolymer (B) may comprise 50 to 99 weight parts, preferably 65 to 95 weight parts and more preferably 70 to 90 weight parts of (b) styrene units with respect to 100 weight parts of the copolymer (B), and 1 to 50 weight parts, preferably 5 to 35 weight parts and more preferably 10 to 30 weight parts of (d) vinyl cyanide units with respect to 100 weight parts of the copolymer (B).

The copolymer (A) and the copolymer (B) may be mixed to a weight ratio of 70:30 to 90:10.

The resin composition may be a compounding resin.

According to another aspect of the present invention, there is provided an optical film formed using the resin composition.

The optical film may have −50 to −250 of a thickness-directional retardation value ($R_{th}$) represented by the following Equation 1, 50 to 200 of a plane-directional retardation value ($R_{in}$) represented by the following Equation 2, and 0.4 to 1.5 of an absolute value of the ratio ($R_{in}/R_{th}$) of the plane-directional retardation value to the thickness-directional retardation value:

$$R_{th}=[(n_x+n_y)/2-n_z]\times d \qquad \text{[Equation 1]}$$

$$R_{in}=(n_x-n_y)\times d, \qquad \text{[Equation 2]}$$

wherein $n_x$ is a refractive index in a direction at which the refractive index is highest in the plane direction of the film, $n_y$ is a refractive index of a direction perpendicular in regard to the $n_x$ direction in the plane direction of the film, $n_z$ is a thickness-directional refractive index of the film, and d is thickness of the film.

The optical film may be an optical film that is a retardation film for in-plane switching (IPS) mode LCD devices.

[Effects of Invention]

A resin composition according to the present invention can provide an optical film having excellent optical properties and superior optical transparency, less haze and superior mechanical strength and heat resistance simultaneously. Therefore, an optical film formed using a resin composition of the present invention can be used in various applications, e.g., electronic information devices such as display devices. Particularly, the optical film is suitable for a compensation film used in the IPS mode.

[Best Mode for Enforcement of Invention]

Hereinafter, embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The present invention provides a resin composition comprising (a) alkyl (meth)acrylate units, (b) styrene units, (c) 3 to 6 element heterocyclic units substituted with at least one carbonyl group, and (d) vinyl cyanide units.

In the present invention, the (a) alkyl (meth)acrylate units can give negative in-plane retardation values ($R_{in}$) and negative thickness-directional retardation values ($R_{th}$) to weak degrees to films, and the (b) styrene units can give negative in-plane retardation values ($R_{in}$) and negative thickness-directional retardation values ($R_{th}$) to strong degrees to the films in the stretching process. On the other hand, the (c) 3 to 6 element heterocyclic units substituted with at least one carbonyl group can provide the films prepared by the resin composition with superior heat resistance, and the (d) vinyl cyanide units can provide the films with superior chemical resistance.

The negative in-plane retardation values mean that refractive indexes are increased to the largest in the direction perpendicular in the in-plane to a stretching direction, the positive in-plane retardation values mean that refractive indexes are increased to the highest in the stretching direction, the negative thickness-directional retardation values mean that thickness-directional refractive indexes are larger than a plane-directional average refractive index, and the positive thickness-directional retardation values mean that the in-plane average refractive index is larger than the thickness-directional refractive indexes.

By properties of each of the above-mentioned units, retardation properties of an optical film prepared from the resin composition may be varied according to composition of each of the components, stretching direction, stretching ratio and stretching method. Therefore, the present invention is capable of preparing a compensation film which can be applied particularly to the LCD IPS mode by controlling the composition of the respective components and stretching method.

A resin composition of the present invention may comprise a combination of 2 member or 3 member copolymers of the units selected from the group consisting of (a) alkyl (meth)acrylate units, (b) styrene units, (c) 3 to 6 element heterocyclic units substituted with at least one carbonyl group, and (d) vinyl cyanide units. More specifically, the copolymer is preferably a combination of (A) a 2 member copolymer consisting of (a) alkyl (meth)acrylate units and (c) 3 to 6 element heterocyclic units substituted with at least one carbonyl group, and (B) a 2 member copolymer consisting of (b) styrene units and (d) vinyl cyanide units.

The copolymer in the present specification means that elements referred to as "units" in the present specification are polymerized as monomers such that the monomers are included in the copolymer resin as repeating units. Although examples of types of the copolymer may include a bloc copolymer and a random copolymer in the present specification, the types of the copolymer are not limited to the examples.

The copolymer (A) comprises 50 to 99 weight parts, preferably 80 to 97 weight parts and more preferably 85 to 95 weight parts of (a) alkyl (meth)acrylate units, and 1 to 50 weight parts, preferably 3 to 20 weight parts and more preferably 5 to 15 weight parts of (c) 3 to 6 element heterocyclic units substituted with at least one carbonyl group with respect to 100 weight parts of the copolymer (A).

There is a problem in transparency if the copolymer (A) comprises less than 50 weight parts of the (a) alkyl (meth)acrylate units, there is a problem that heat resistance of the resin composition drops if the copolymer (A) comprises more than 99 weight parts of the (a) alkyl (meth) acrylate units, there is a problem that insufficient heat resistance of the resin composition is accompanied by heat strain of the film if the copolymer (A) comprises less than 1 weight part of the (c) 3 to 6 element heterocyclic units substituted with at least one carbonyl group, and there is a problem that the heterocyclic units are precipitated during the heat forming process if the copolymer (A) comprises more than 50 weight parts of the (c) 3 to 6 element heterocyclic units substituted with at least one carbonyl group.

The copolymer (B) comprises 50 to 99 weight parts, preferably 65 to 95 weight parts and more preferably 70 to 90 weight parts of (b) styrene units with respect to 100 weight parts of the copolymer (B), and comprises 1 to 50 weight parts, preferably 5 to 35 weight parts and more preferably 10 to 30 weight parts of (d) vinyl cyanide units with respect to 100 weight parts of the copolymer (B).

There is a problem that the resin composition is not easily processed if the copolymer (B) comprises less than 50 weight parts of the (b) styrene units, and there is a problem that color of the resin composition is severely changed if the copolymer (B) comprises more than 95 weight parts of the (b) styrene units. There is a incompatibility problem that the copolymer (B) may not be properly mixed with the copolymer (A) if the copolymer (B) comprises less than 1 weight part of the (d) vinyl cyanide units, and there is a problem that carbides may be produced during the processing process of the resin composition if the copolymer (B) comprises more than 50 weight parts of the (d) vinyl cyanide units.

On the other hand, it is preferable that the copolymer (A) and the copolymer (B) are mixed to a weight ratio of 70:30 to 90:10 if a resin composition of the present invention comprises a combination of the copolymer (A) and the copolymer (B). There is a problem that a retardation revelation of a film is limited if the resin composition comprises the copolymer (A) in an amount that is less than the foregoing amount range, and there may be a compatibility problem between the copolymer (A) and the copolymer (B) if the resin composition comprises the copolymer (A) in an amount that is more than the foregoing amount range.

The resin composition of the present invention preferably comprises a phenoxy-based resin, the phenoxy-based resin may include 5 to 10,000, preferably 5 to 7,000 and more preferably 5 to 5,000 of at least one unit represented by the following formula 1, and these units may be included in the phenoxy-based resin in a random, alternating, or block form:

[Formula 1]

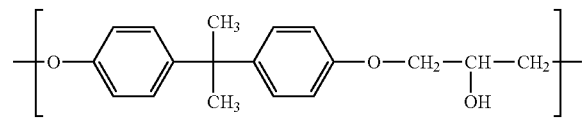

On the other hand, the phenoxy-based resin preferably has a number average molecular weight of 1,500 to 2,000,000 g/mol. There is a problem that physical properties of the film are deteriorated if the number average molecular weight is less than 1,500 g/mol, and there is a compatibility problem that the phenoxy-based resin is not mixed with a copolymer of the present invention if the number average molecular weight is more than 2,000,000 g/mol.

The phenoxy-based resin is preferably contained in the amount of 1 to 5 weight parts with respect to 100 weight parts of the total resin composition, there is a problem that a retardation-revealing effect is not great if the phenoxy-based resin is contained in an amount less than 1 weight part, since the phenoxy-based resin plays a role of controlling the retardation of the film that is generated while stretching the phenoxy-based resin, and there is a problem that the phenoxy-based resin is not easily mixed with the copolymer if the phenoxy-based resin is contained in the amount of more than 5 weight parts. It is possible to prepare a strength-improved film if the resin composition comprises the phenoxy-based resin.

In the present specification, (a) 'alkyl (meth)acrylate units' mean that they may include both 'alkyl acrylate units' and 'alkyl methacrylate units'. Alkyl moieties of the alkyl (meth) acrylate units are preferably 1 to 10 carbon atoms, more preferably 1 to 4 carbon atoms, and most preferably methyl or ethyl groups. Although the alkyl methacrylate units are more preferably methyl methacrylate, they are not limited thereto.

Although non-substituted styrene units can be used as the styrene units (b), the styrene units (b) comprise styrene in which benzene rings or vinyl groups of styrene are substituted with one or more substituents selected from groups consisting of aliphatic hydrocarbons and hetero atoms. More specifically, units substituted with one or more substituents selected from groups consisting of $C_{1-4}$ alkyl and halogen groups can be used as the styrene units. More preferably, one or more selected from the group consisting of α-methyl styrene, p-bromo styrene, p-methyl styrene and p-chloro styrene may be used as the styrene units.

The foregoing (c) 3 to 6 element heterocyclic units substituted with at least one carbonyl group can be selected from the group consisting of maleic anhydride, maleimide, glutaric anhydride, glutarimide, lactone, and lactam.

The (d) vinyl cyanide units may be selected from the group consisting of acrylic acid, methacrylic acid, an alkyl ester of acrylic acid and methacrylic acid, methacrylonitrile, acrylamide and acrylonitrile.

A resin composition according to the present invention can be prepared by blending the above-mentioned components according to methods well known in the art such as a compounding method, and melt mixing of the components can be carried out using an extruder and so on.

Further, if it is necessary, the resin composition may comprise additives well known to the art such as a lubricant, an antioxidant, a UV stabilizer, a heat stabilizer and others that are usually used.

An optical film according to the present invention can be formed using the above-mentioned resin composition. Specifically, an optical film according to the present invention can be prepared by a method comprising the step of forming a film after obtaining the resin composition, and the method may further comprise the step of monoaxially or biaxially stretching the film.

An optical film according to the present invention may be prepared using any method known in the art, specifically an extrusion molding method. For instance, the method may comprise the steps of vacuum drying the resin composition to remove water and dissolved oxygen, feeding the resin composition to a single or twin extruder that had been substituted with nitrogen from a raw material hopper to the extruder, melting the resin composition at high temperatures to obtain raw material pellets, vacuum drying the obtained raw material pellets, melting the vacuum dried raw material pellets by a single extruder that had been substituted with nitrogen from the raw material hopper to the extruder, passing the molten material through a coat hanger type T-die, and then passing the resultant material through a chromium-coated casting roll, drying rolls, and others to prepare a film. The method may further comprise the step of monoaxially or biaxially stretching the film.

Although an optical film formed using the resin composition of the present invention preferably has a thickness of 5 to 300 μm, its thickness is not limited thereto. The optical film may have light transmittance of 90% or more, and a haze value of 2.5% or less, preferably 1% or less, and more preferably 0.5% or less. If the optical film has light transmittance of less than 90% and a haze value of more than 2.5%, luminance of a LCD device in which such an optical film is used may be reduced.

It is preferable that an optical film according to the present invention has a glass transition temperature of 110° C. or more, and it is more preferable that the optical film has a glass transition temperature of 120° C. or more. Although the resin composition may have a glass transition temperature of 200° C. or less, its glass transition temperature is not limited thereto. If the resin composition has a glass transition temperature of less than 110° C., insufficient heat resistance of the resin composition easily causes deformation of a film at high temperature and high humidity conditions to result in a problem that compensating characteristics of the film become uneven.

Further, it is preferable that the resin composition has a weight average molecular weight of 50,000 to 500,000 from the aspects of heat resistance, formability, and productivity.

An optical film according to the present invention is preferably a retardation film for IPS and may have different retardation values according to the content of the (a) alkyl (meth) acrylate units or (b) styrene units.

A retardation compensation film for In-pane switching (IPS) mode LCD devices preferably has 0.4 to 1.5 of an absolute value of the ratio ($R_{in}/R_{th}$) of a plane-directional retardation value to a thickness-directional retardation value. The optical film according to the present invention preferably has, under light with a wavelength of 550 nm, a thickness-directional retardation ($R_{th}$) value of −50 to −250 as represented by the following Equation 1, a plane-directional retardation ($R_{in}$) value of 50 to 200 as represented by the following Equation 2, and an absolute value of the ratio ($R_{in}/R_{th}$) of the plane-directional retardation to the thickness-directional retardation of 0.4 to 1.5:

$$R_{th}=[(n_x+n_y)/2-n_z]\times d \quad \text{[Equation 1]}$$

$$R_{in}=(n_x-n_y)\times d, \quad \text{[Equation 2]}$$

wherein $n_x$ is a refractive index of a direction at which the refractive index is largest in a plane direction of the film, $n_y$ is a refractive index of a direction perpendicular to the $n_x$ direction in the plane direction of the film, $n_z$ is a thickness-directional refractive index of the film, and d is thickness of the film.

[Mode for Enforcement of Invention]

Hereinafter, the present invention will be described in more detail with reference to the following examples.

EXAMPLE

1. Preparation of a Resin Composition According to the Present Invention

Example 1

Raw material pellets were prepared by feeding a resin composition in which poly(N-cyclohexylmaleimide-co-methylmethacrylate) (A) and styrene-acrylonitrile copolymer resin(B) were uniformly mixed at a weight ratio of 90:10 to a 24ϕ extruder that had been substituted with nitrogen from a raw material hopper to the extruder, thereby melting the resin composition at 250° C. A glass transition temperature (Tg) of the prepared resin was measured using a DSC, and a measurement result was represented in the following table 1.

SAN 82TR (MFR: 18 g/10 min (230° C., 3.8 kg), and Tg=105° C.) having an acrylonitrile content of 20 wt.% prepared by LG Chemical Co., Ltd. was used as the styrene-acrylonitrile copolymer resin. As a result of NMR analysis, poly(N-cyclohexylmaleimide-co-methylmethacrylate) resin comprised 6.5 wt.% of N-cyclohexylmaleimide.

Example 2

Raw material pellets were prepared by feeding a resin composition in which poly(N-cyclohexylmaleimide-co-methylmethacrylate) (A) and styrene-acrylonitrile copolymer resin(B) had been uniformly mixed to a weight ratio of 80:20 to a 24ϕ extruder that had been substituted with nitrogen from a raw material hopper to the extruder, thereby melting the resin composition at 250° C. A glass transition temperature (Tg) of the prepared resin was measured using a DSC, and measurement result was represented in the following table 1. The same styrene-acrylonitrile copolymer resin and poly(N-cyclohexylmaleimide-co-methylmethacrylate) resin as in the Example 1 were used.

Example 3

Raw material pellets were prepared by feeding a resin composition in which poly(N-cyclohexylmaleimide-co-methylmethacrylate) (A) and styrene-acrylonitrile copolymer resin(B) had been uniformly mixed to a weight ratio of 70:30 to a 24ϕ extruder that had been substituted with nitrogen from a raw material hopper to the extruder, thereby melting the resin composition at 250° C. A glass transition temperature (Tg) of the prepared resin was measured using a DSC, and a measurement result was represented in the following table 1. The same styrene-acrylonitrile copolymer resin and poly(N-cyclohexylmaleimide-co-methylmethacrylate) resin as in the Example 1 were used.

Example 4

Raw material pellets were prepared by feeding a resin composition in which poly(N-cyclohexylmaleimide-co-methylmethacrylate) (A), styrene-acrylonitrile copolymer resin (B), and phenoxy-based resin(C) had been uniformly mixed to a weight ratio of 75:20:5 to a 24ϕ extruder that had been substituted with nitrogen from a raw material hopper to the extruder, thereby melting the resin composition at 250° C. A glass transition temperature (Tg) of the prepared resin was measured using a DSC, and measurement result was represented in the following table 1. The same styrene-acrylonitrile copolymer resin and poly(N-cyclohexylmaleimide-co-methylmethacrylate) resin as in the Example 1 were used.

Comparative Example 1

Raw material pellets were prepared by feeding 100 parts of weight of poly(N-cyclohexylmaleimide-co-methylmethacrylate)(A) resin composition to a 24φ extruder that had been substituted with nitrogen from a raw material hopper to the extruder, thereby melting the resin composition at 250° C. A glass transition temperature (Tg) of the prepared resin was measured using a DSC, and a measurement result was represented in the following table 1.

Comparative Example 2

Raw material pellets were prepared by feeding a resin composition in which poly(N-cyclohexylmaleimide-co-methylmethacrylate) (A) and phenoxy-based resin(C) had been uniformly mixed to a weight ratio of 80:20 to a 24φ extruder that had been substituted with nitrogen from a raw material hopper to the extruder, thereby melting the resin composition at 250° C. A glass transition temperature (Tg) of the prepared resin was measured using a DSC, and measurement result was represented in the following table 1.

Comparative Example 3

Raw material pellets were prepared by feeding a resin composition in which poly(N-cyclohexylmaleimide-co-methylmethacrylate)(A) and styrene-maleic anhydride copolymer resin (D) had been uniformly mixed to a weight ratio of 80:20 to a 24φ extruder that had been substituted with nitrogen from a raw material hopper to the extruder, thereby melting the resin composition at 250° C. A glass transition temperature (Tg) of the prepared resin was measured using a DSC, and measurement result was represented in the following table 1.

TABLE 1

| Sample | Resin composition | Weight ratio | Glass transition temperature(Tg, ° C.) |
|---|---|---|---|
| Example 1 | A:B | 90:10 | 122 |
| Example 2 | A:B | 80:20 | 119 |
| Example 3 | A:B | 70:30 | 116 |
| Example 4 | A:B:C | 75:20:5 | 118 |
| Comparative Example 1 | A | 100 | 124 |
| Comparative Example 2 | A:C | 80:20 | 114 |
| Comparative Example 3 | A:D | 80:20 | 130 |

2. Preparation of an Optical Film Using a Resin Composition According to the Present Invention A film having a thickness of 150 μm was prepared by passing the molten material through a coat hanger type T-die and passing the resultant material through a chromium-coated casting roll, drying rolls, and others after vacuum drying raw material pellets obtained in Example 2 and Comparative Example 1 and melting the vacuum dried raw material pellets at 250° C. by an extruder.

The film was stretched to a ratio listed in the Table 2 in MD and TD directions at a temperature condition that was about 2 to 10° C. higher than the glass transition temperature of the resin using film stretching equipment for testing in order to prepare a biaxially stretched film. Plane-directional and thickness-directional retardation values of the film were represented in the following Table 2.

TABLE 2

| Sample | Stretching temperature (° C.) | Stretching ratio (%) MD | Stretching ratio (%) TD | Retardation (nm) $R_{in}$ | Retardation (nm) $R_{th}$ | Thickness (μm) |
|---|---|---|---|---|---|---|
| Example 2 | 127 | 10 | 122 | 116.4 | −104.2 | 60 |
| Example 2 | 127 | 10 | 142 | 130.2 | −110.1 | 60 |
| Example 2 | 127 | 10 | 163 | 144.8 | −118.8 | 60 |
| Example 2 | 127 | 10 | 168 | 146.5 | −119.4 | 60 |
| Example 2 | 127 | 24 | 112 | 96.7 | −111.9 | 60 |
| Example 2 | 127 | 24 | 122 | 106.5 | −114.1 | 60 |
| Example 2 | 127 | 24 | 153 | 127.0 | −119.0 | 60 |
| Example 2 | 127 | 24 | 163 | 133.3 | −121.7 | 60 |
| Example 2 | 127 | 32 | 112 | 99.7 | −120.5 | 60 |
| Example 2 | 127 | 32 | 122 | 114.0 | −127.4 | 60 |
| Example 2 | 127 | 32 | 153 | 130.4 | −133.0 | 60 |
| Example 2 | 127 | 32 | 163 | 136.9 | −135.1 | 60 |
| Example 2 | 127 | 32 | 168 | 144.1 | −139.5 | 60 |
| Example 2 | 127 | 41 | 112 | 88.5 | −114.8 | 60 |
| Example 2 | 127 | 41 | 132 | 103.3 | −120.0 | 61 |
| Example 2 | 127 | 41 | 142 | 114.3 | −129.5 | 62 |
| Example 2 | 127 | 41 | 163 | 129.8 | −137.2 | 63 |
| Example 2 | 127 | 41 | 168 | 132.9 | −137.1 | 64 |
| Comparative Example 1 | 132 | 41 | 112 | 24.3 | −31.6 | 60 |
| Comparative Example 1 | 132 | 41 | 132 | 26.4 | −33.7 | 61 |
| Comparative Example 1 | 132 | 41 | 142 | 29.8 | −35.2 | 60 |
| Comparative Example 1 | 132 | 41 | 168 | 29.3 | −36.3 | 60 |

As can be seen from the results, it can be confirmed that an optical film prepared by a resin composition of the present invention have greatly developed to such a degree that the resin composition can be used in the preparation retardation films for LCD devices of IPS mode requiring that thickness-directional retardation values are negative values (−) $R_{th}$, and the retardation values can be controlled by controlling stretching ratios and stretching temperatures.

3. Preparation of an Optical Film Comprising Phenoxy-based Resin

A film having a thickness of 150 μm was prepared by passing the molten material through a coat hanger type T-die and passing the resultant material through a chromium-coated casting roll, drying rolls, and others after vacuum drying raw material pellets obtained in the Examples 2 and 4 and Comparative Example 2 and melting the vacuum dried raw material pellets at 250° C. by an extruder. A biaxially stretched film was prepared by biaxially stretching the resin composition to a ratio listed in the Table 3 in MD and TD directions at a temperature condition that was about 2 to 10° C. higher than the glass transition temperature of the resin using film stretching equipment for testing. Plane-directional and thickness-directional retardation values of the film were represented in the following Table 3.

TABLE 3

| Sample | Stretching ratio (%) MD | Stretching ratio (%) TD | Retardation (nm) $R_{in}$ | Retardation (nm) $R_{th}$ | Thickness (μm) | Falling ball impact height (mm) |
|---|---|---|---|---|---|---|
| Example 2 | 41 | 112 | 88.5 | −114.8 | 60 | 547 |
| Example 4 | 50 | 100 | 74.7 | −103.4 | 60 | 623 |
| Comparative Example 2 | 50 | 75 | 27 | 110 | 60 | 704 |
| Comparative Example | 50 | 100 | 58 | 126 | 60 | 736 |

TABLE 3-continued

| | Stretching ratio (%) | | Retardation (nm) | | Thickness | Falling ball impact |
|---|---|---|---|---|---|---|
| Sample | MD | TD | $R_{in}$ | $R_{th}$ | (μm) | height (mm) |
| Example 2 | | | | | | |
| Comparative Example 2 | 75 | 100 | 25 | 133 | 60 | 789 |

A thickness-directional retardation value does not satisfy a negative value in an optical film prepared by the resin composition of the Comparative Example 2. Therefore, it can be confirmed that it is not appropriate to use the optical film as viewing angle-compensating retardation films for an IPS mode. On the other hand, it can be confirmed that there is an embodied effect of increasing a falling ball impact height which exhibits strength of the film in the case of introducing phenoxy-based resin as in the Example 4 compared to the Example 2.

Preparation of an Optical Film Comprising Styrene-maleic Anhydride Units

After preparing a film using raw material pellets obtained in the Comparative Example 3 and Example 2, a biaxially stretched film was prepared by biaxially stretching the film in MD and TD directions at a temperature condition that was about 2 to 10° C. higher than the glass transition temperature of the resin using film stretching equipment for testing. Stretching conditions and plane-directional and thickness-directional retardation values of the stretched film were represented in the following Table 4 respectively.

TABLE 4

| Sample | Stretching temperature (° C.) | Stretching ratio (%) | | Retardation (nm) | | Thickness (μm) |
|---|---|---|---|---|---|---|
| | | MD | TD | $R_{in}$ | $R_{th}$ | |
| Comparative Example 3 | 134 | 20 | 121 | 107 | −118.1 | 60 |
| Comparative Example 3 | 134 | 20 | 162 | 141 | −132.6 | 60 |
| Comparative Example 3 | 134 | 20 | 182 | 163 | −134.8 | 60 |
| Comparative Example 3 | 134 | 26 | 101 | 88 | −116.2 | 60 |
| Comparative Example 3 | 134 | 26 | 121 | 96 | −116.6 | 60 |
| Comparative Example 3 | 134 | 26 | 131 | 112 | −127.1 | 60 |
| Comparative Example 3 | 134 | 26 | 141 | 115 | −124.2 | 60 |
| Comparative Example 3 | 134 | 26 | 172 | 136 | −136.3 | 60 |
| Comparative Example 3 | 134 | 26 | 177 | 136 | −132.2 | 60 |
| Comparative Example 3 | 134 | 31 | 101 | 68 | −104.3 | 60 |
| Comparative Example 3 | 134 | 31 | 101 | 68 | −104.3 | 60 |
| Comparative Example 3 | 134 | 31 | 121 | 90 | −121.0 | 60 |
| Comparative Example 3 | 134 | 31 | 141 | 108 | −128.1 | 60 |
| Comparative Example 3 | 134 | 31 | 167 | 125 | −134.2 | 60 |
| Comparative Example 3 | 134 | 31 | 172 | 129 | −134.4 | 60 |
| Comparative Example 3 | 134 | 31 | 172 | 129 | −136.1 | 60 |
| Comparative Example 3 | 134 | 31 | 177 | 135 | −136.3 | 60 |
| Comparative Example 3 | 134 | 31 | 182 | 137 | −133.7 | 60 |
| Comparative Example 3 | 134 | 41 | 101 | 67 | −118.7 | 60 |
| Comparative Example 3 | 134 | 41 | 121 | 77 | −122.4 | 60 |
| Comparative Example 3 | 134 | 41 | 152 | 104 | −134.3 | 60 |
| Comparative Example 3 | 134 | 41 | 162 | 117 | −142.2 | 60 |
| Comparative Example 3 | 134 | 41 | 177 | 128 | −143.3 | 60 |
| Comparative Example 3 | 134 | 41 | 182 | 128 | −140.1 | 60 |
| Example 2 | 127 | 41 | 112 | 88.5 | −114.8 | 60 |
| Example 2 | 127 | 41 | 132 | 103.3 | −120.0 | 61 |
| Example 2 | 127 | 41 | 142 | 114.3 | −129.5 | 62 |
| Example 2 | 127 | 41 | 163 | 129.8 | −137.2 | 63 |

As shown in the Table 4, although a thickness-directional retardation value of the film comprising styrene-maleic anhydride units prepared by the Comparative Example 3 satisfied a range in which the film was capable of being applied as an IPS mode viewing angle-compensating film, there were problems that appearance defects were caused by decomposition while processing the film, and strength values of the film products were lowered since maleic anhydride was weak in water, and had very hard properties.

While the present invention has been shown and described in connection with the exemplary embodiments, it will be apparent to those skilled in the art that modifications and variations can be made without departing from the spirit and scope of the invention as defined by the appended claims.

The invention claimed is:

1. A resin composition comprising a combination of (A) a 2 member copolymer consisting of 80 to 97 weight parts of (a) alkyl (meth)acrylate units and 3 to 20 weight parts of (c) 3 to 6 heterocyclic units substituted with at least one carbonyl group with respect to 100 weight parts of the copolymer (A), and (B) a 2 member copolymer consisting of 50 to 99 weight parts of (b) styrene units and 1 to 50 weight parts of (d) vinyl cyanide units with respect to 100 weight parts of the copolymer (B);

wherein the (c) 3 to 6 heterocyclic units substituted with at least one carbonyl group are selected from the group consisting of maleimide and lactam;

wherein the resin composition further comprises a phenoxy-based resin, and wherein the phenoxy based resin includes 5 to 10,000 of at least one unit represented by the following formula 1:

[Formula 1]

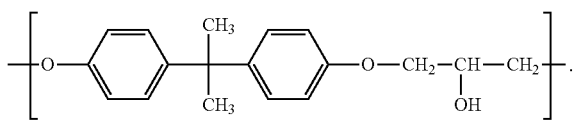

2. The resin composition of claim 1, wherein the (a) alkyl (meth)acrylate units have alkyl moieties that are methyl groups or ethyl groups.

3. The resin composition of claim 1, wherein the (b) styrene units are one or more selected from the group consisting of styrene in which benzene ring or vinyl groups of styrene are substituted with one or more substituents selected from groups consisting of C1-4 alkyl and halogen groups.

4. The resin composition of claim 1, wherein the (b) styrene units are one or more selected from the group consisting of α-methyl styrene, p-bromo styrene, p-methyl styrene, and p-chloro styrene.

5. The resin composition of claim 1, wherein the (d) vinyl cyanide units are selected from the group consisting of methacrylonitrile-and acrylonitrile.

6. The resin composition of claim 1, wherein the phenoxy based resin is mixed in the amount of 1 to 5 weight parts with respect to 100 weight parts of the total resin composition.

7. The resin composition of claim 1, wherein the copolymer (A) comprises 85 to 95 weight parts of (a) alkyl (meth) acrylate units and 5 to 15 weight parts of (c) 3 to 6 heterocyclic units substituted with at least one carbonyl group with respect to 100 weight parts of the copolymer (A).

8. The resin composition of claim 1, wherein the copolymer (B) comprises 65 to 95 weight parts of (b) styrene units and 5 to 35 weight parts of (d) vinyl cyanide units with respect to 100 weight parts of the copolymer (B).

9. The resin composition of claim 1, wherein the copolymer (B) comprises 70 to 90 weight parts of (b) styrene units and 10 to 30 weight parts of (d) vinyl cyanide units with respect to 100 weight parts of the copolymer (B).

10. The resin composition of claim 1, wherein the copolymer (A) and the copolymer (B) are mixed to a weight ratio of 70:30 to 90:10.

11. The resin composition of claim 1, wherein the resin composition is a compounding resin.

12. An optical film formed using a resin composition of claim 1.

13. The optical film of claim 12, wherein the optical film has −50 nm to −250 nm of a thickness-directional retardation value (Rth) represented by the following Equation 1 under light having a wavelength of 550 nm:

$$R_{th}=[(n_x+n_y)/2-n_z]]\times d \quad \text{[Equation 1]}$$

wherein $n_x$ is a refractive index in a direction at which the refractive index is highest in the plane direction of the film, $n_y$ is a refractive index of a direction perpendicular in regard to the $n_x$ direction in the plane direction of the film, $n_Z$ is a thickness-directional refractive index of the film, and d is thickness of the film.

14. The optical film of claim 12, wherein the optical film has 50 nm to 200 nm of a plane-directional retardation value (Rin) represented by the following Equation 2 under light having a wavelength of 550 nm:

$$R_{in}=(n_x-n_y)\times d \quad \text{[Equation 2]}$$

wherein $n_x$ is a refractive index in a direction at which the refractive index is highest in the plane direction of the film, $n_y$ is a refractive index of a direction perpendicular in regard to the $n_x$ direction in the plane direction of the film, $n_Z$ is a thickness-directional refractive index of the film, and d is thickness of the film.

15. The optical film of claim 12, wherein the optical film has 0.4 to 1.5 of an absolute value of the ratio ($R_{in}/R_{th}$) of the plane-directional retardation value represented by the following Equation 2 to the thickness-directional retardation value represented by the following Equation 1 under light having a wavelength of 550 nm:

$$R_{th}=[(n_x+n_y)/2-n_z]\times d \quad \text{[Equation 1]}$$

$$R_{in}=(n_x-n_y)\times d \quad \text{[Equation 2]}$$

wherein $n_x$ is a refractive index in a direction at which the refractive index is highest in the plane direction of the film, $n_y$ is a refractive index of a direction perpendicular in regard to the $n_x$ direction in the plane direction of the film, $n_z$ is a thickness-directional refractive index of the film, and d is thickness of the film.

16. The optical film of claim 12, wherein the optical film is a retardation film for in-plane switching (IPS) mode LCD devices.

* * * * *